2,891,015

CARBOXYLIC ACID TYPE CATION EXCHANGE RESINS PREPARED IN THE PRESENCE OF PLASTICIZER AND POLYMER

Yoshio Tsunoda and Maomi Seko, Okatomi, Nobeoka-shi, Miyazaki-ken, Japan, assignors to Asahi Chemical Industry Co., Ltd., Osaka, Japan No Drawing. Application August 24, 1954
Serial No. 451,973

10 Claims. (Cl. 260—2.2)

This invention relates to the carboxylic acid type cation exchange resins having large dimensions and granular carboxylic acid type resins which are not fractured in any step of their preparations. This invention is concerned, more particularly, with the carboxylic acid type cation exchange resins which are the reaction product of monovinyl compound having carboxylic acid or carboxylic acid esters and polyolefinic compound, said carboxylic acid esters being hydrolysed after polymerisation. This invention is concerned, further particularly, with the composition and the preparation of said carboxylic acid type cation exchange base polymer matrix comprising monovinyl compound having carboxylic acid or carboxylic acid esters, wherein said base polymer matrix comprising monovinyl compound having carboxylic acid is already cation exchange resin by itself, and also said base polymer matrix comprising monovinyl compound having carboxylic acid esters is hydrolysed after polymerisation. This invention is concerned, especially, with the carboxylic acid type cation exchange resins having at least two dimensions each in excess of 1 cm., having a shape of sheet, rod, tube and etc. and with the granular carboxylic acid type cation exchange resins which are not fractured in any step of preparation e.g., polymerisation, hydrolysis or other chemical treatments.

There were known many synthetic carboxylic acid type cation exchange resins, but these resins are granules of small particle size, usually considerably below than 0.1 cm. in diameter. These granular resins have been used in a system in which they were either contacted with a solution until equilibrium has been reached or the solution has passed through a stationary bed of ion exchange granules. The purpose of these granular resins were absorption of cation and therefore they did not necessitate to prepare the cation exchange resins of large dimension. In the U.S. Patent 2,636,851 of W. Juda and W. A. MacRae, the ion exchange materials having at least two dimensions each in excess of 0.8 cm. were described, but this patent relates only to the preparation of moulded diaphragm of Dowex 50, Amberlite IRC-50 or Amberlite IRA-400, and homogeneous membrane of condensed phenol sulphonic acid and formaldehyde, and condensed melamine guanidine and formaldehyde and there were no description about the preparation of homogeneous carboxylic acid type cation exchange resins having large dimensions. But, in this patent, regarding the carboxylic acid type action exchange resins, only the granular insoluble infusible cation exchange resins are used for the preparation of memberane, therefore, the binder was always necessary for their purpose. As the binder many sorts of materials such as thermoplastic polymers or phenolic condensates of considerable low molecular weight which comprises ion exchange groups were used. Therefore, in these cases, they could not be uniform polymeric material and had many disadvantages. For instance, if the binder was a plastic material such as polystyrene, the surface of cation exchange resin was covered by the binder, and therefore, the functions and stability of the cation exchange group were considerably decreased, so that they became inferior in electrochemical performance, that is, could not be superior ion exchange materials having high permselectivity for cation in electrolytic solution and high electric conductivity. When the granules of ion exchange resins of carboxylic acid type were covered by phenolic condensible binder, the stability and the function of said cation exchange resins were quite decreased. On the contrary, the carboxylic acid type resins of this invention, however large the dimensions of resin is, are homogeneous in their structure, entirely different from the usual ones, having high permselectivity for cation in electrolytic aqueous solution and high electric conductivity. In spite of these disadvantages that the ion exchange groups were covered by other material, usual method of the preparation of the ion exchange resin of large dimensions could not help using a binder or other material especially for acrylic acid-divinylbenzene series cation exchange resin. This was due to the fact that the base copolymer matrix of monovinyl aliphatic compounds having carboxylic acid or carboxylic acid esters and polyolefinic compound was easily cracked during the polymerisation to prepare its large bulk polymer matrix, or during the hydrolysis reaction period to hydrolyse the esters into acid radical.

This invention has overcome these essential defects. Any size of, any form of homogeneous carboxylic acid type cation exchange resins are prepared without cracking in all steps of their preparation. Therefore, the various electrochemical characteristics are very much improved. In general, usual carboxylic acid type cation exchange resins are prepared by the following steps: polymerisation of compounds, which compounds have carboxylic acid or carboxylic acid esters and one polymerizable double bond in the same compound, and polyolefinic compound, and as a result, said cation exchange groups are bonded to said polymer matrix already when said monomer having acid radical is used, and said cation exchange groups are bonded to said polymer matrix after the carboxylic acid esters are changed to acid radical by the hydrolysis reaction of acid esters when said monomer having acid esters is used.

Ion exchange group, —COOH, is so hydrophilic that the resin should be made to be insoluble by the crosslinking agent. In the bulk and solution polymerisation for the preparation of base polymer matrix having large dimension, or of the crack-proof granular base polymer, the larger the dimension of base polymer matrix and the more the content of crosslinking agent, the more remarkably the tendency towards cracking was observed. There are various kinds of compositions regarding carboxylic acid type cation exchange resins, and these usual granular carboxylic acid type cation exchange resins are exemplified in the following patents. But these patents did not aim essentially the unfractured carboxylic acid type cation exchange resins of large dimension or crack-proof granular carboxylic acid type cation exchange resins. In the cases of carboxylic acid type cation exchange resins, as described in the U.S. Patent No. 2,340,111, 2,597,437 and 2,471,818, vinyl monomer having carboxylic acid radical or carboxylic acid esters, crosslinking agents and other vinyl compound are mixed and completely copolymerized in finely divided granular forms, most conveniently by the suspension copolymerisation.

These known processes are not successful to prepare the carboxylic acid type cation exchange resins having large dimensions and crack-proof granular carboxylic acid type cation exchange resins, especially to prepare the carboxylic acid type cation exchange membranes. The reasons why the known processes were unsuccessful were that these base polymer matrix is easily cracked or fractured during the processes of its preparation. These circumstances are explained in detail as following.

Carboxylic acid type cation exchange resins having at least two dimensions each in excess of 1 cm., could not be made by the usual method, because the cracks or fractures occurred in the process of polymerisation in bulk or solution of monovinyl compound monomer having acid radical or esters and polyolefinic monomer, or in the process in which carboxylic acid esters are hydrolysed to acid, when said monomer having carboxylic acid esters is used. In the preparation of the usual granular carboxylic acid type cation exchange resins, they used to make pearl-like beads between 40 and 60 mesh by suspension copolymerisation of monovinyl compound monomer having carboxylic acid radical or carboxylic acid esters and polyolefinic monomer in an aqueous solution containing protective colloid. But the crack was not so serious comparing with the case of this invention, whose purpose is to make resins having large dimensions. According to literatures, the following are the cases in which cracks occur in the preparation of ion exchange resins having at least two dimensions each in excess of 1 cm.

(1) Process in copolymerisation of monovinyl compounds having carboxylic acid or carboxylic acid esters and polyolefinic monomer.

(2) Process in hydrolysing said base polymer matrix to acid, when said base polymer matrix having carboxylic acid esters is used.

(3) Process to drain-off and washing of chemical reagents after hydrolysis.

The larger the size of the carboxylic acid type cation exchange resin, the more often it is necessary to have less swelling resins for its application than in case of small granules. For this purpose of obtaining less swelling resins, resins containing more polyolefinic monomer are required so that more crosslinking may be formed in the polymer matrix, while cracking happens more easily during the process of polymerisation, the hydrolysis wherein carboxylic acid esters are hydrolysed to acid, and washing, as polyolefinic monomer increase in base polymer matrix. As an example, followings are the explanation of the above-mentioned characteristic of the carboxylic acid type cation exchange membrane using monovinyl compound having carboxylic acid esters. It is impossible to obtain membrane of carboxylic acid type cation exchange resin by transforming usual granular resins, as it is insoluble in any solvent and not softened nor fusible by heat. It is, therefore, required to make first membrane type base polymer matrix of monovinyl compound having carboxylic acid esters and divinylbenzene, in order to make carboxylic acid type cation exchange membrane. But the base polymer matrix having large area cannot be obtained, as it cracks, during the polymerisation, under the ordinary conditions same as or similar to that of preparation of usual granular resins, in solution or bulk polymerisation. In a special case, the monomers could be polymerized at a lower temperature and with a longer period of polymerisation than usual, and an unfractured sheet form base polymer matrix could be obtained. Even in the case of using carboxylic acid esters, the sheet obtained in this way cannot be hydrolysed without cracks. Generally the base polymer matrix swell in the step of hydrolysis, and this swelling damages and destroys the structure of the said base matrix. In almost all cases, therefore, the sheet form matrix of abovementioned copolymer is reduced to small pieces and so the carboxylic acid type cation exchange membrane could not be obtained successfully. Fractures occur more easily after the hydrolysis. The hydrolysed sheet form resin is easily broken, when the resin is taken out from the hydrolysing medium after hydrolysis and as soon as the resin is immersed into water to drain off the excess hydrolysing medium. If a sheet form cation exchange resin is wanted, the washing must be done very carefully, therefore, the resin must be washed several times by using the several batches of the solution of gradually decreasing concentration.

However, we have now discovered a quite new method for the preparation of base polymer matrix suitable for the carboxylic acid type cation exchange resins having at least two dimensions each in excess of 1 cm., and crack-proof granular ion exchange resins, which will never be damaged, nor cracked and nor fractured during the step of polymerisation and hydrolysis in which carboxylic acid esters are hydrolysed to acid, and of the treating in which the polymerizates undergo swelling and shrinking regardless of the dimension of the resins. According to our invention, the linearly polymerizable monovinyl compound having carboxylic acid or carboxylic acid esters, is first partially polymerized into the liquid mixture containing partially polymerized polymerizate and monomer, which mixture contains more than 0.1% of the said partially polymerized polymerizate, and next polyolefinic compound is added to this solution as a crosslinking agent and thus a clear uniform solution is obtained. This mixed solution is subjected to the polymerisation, and thereafter, the carboxylic acid groups are bonded to this base polymer matrix by hydrolysis and thus an carboxylic acid type cation exchange resins having at least two dimensions each in excess of 1 cm. and crack-proof granules are obtained. These base polymer matrix shows quite different characteristics from the usual base polymer matrix which is obtained by the usual method of polymerisation starting from the monomers themselves. For instance, the base polymer matrix obtained by our process does not crack in the step of washing or hydrolysis after polymerisation. The mechanical characteristics, such as the resistance to the bending etc. are also superior to the known polymerizates. Also usual base polymer matrix made of monovinyl compound having carboxylic acid esters and divinylbenzene are transparent, whereas that of our invention is white turbid and opaque. Furthermore, if the usual granular carboxylic acid type cation exchange resins are immersed in fresh water directly after hydrolysis, the granular resin used to shatter. Therefore, in order to avoid the shattering of the resin, the carboxylic acid type cation resin must be immersed first into the concentrated salt solution, and concentration of said salt solution must be decreased gradually. By the same reason, the larger the dimension of the carboxylic acid type cation exchange resin prepared by the known process, the more the accumulation of the strain due to the swelling and shrinking will result, and the resin will be shattered and spalled more easily. On the contrary, the resin prepared by this invention does not shatter nor spall even if the resin is immersed into the fresh water directly after the hydrolysis. These are the main differences of physical and chemical characteristics of the base polymer matrix prepared by the usual process and by the process of this invention. Quite similar phenomena of cracking and spalling were also observed, when the monovinyl compound monomer having carboxylic acid and polyolefinic compound are used for the preparation of carboxylic acid type cation exchange membrane. These relations are quite similar in all cases of preparation of other forms of carboxylic cation exchange resins such as rod, pipe etc.

Concrete method of our invention is shown as follows: A monovinyl compound monomer having carboxylic acid or carboxylic acid ester is partially polymerized to an extent of more than 0.1% by weight, and this solution which contains partially polymerized polymerizate and said monomer were mixed with polyolefinic compound with or without other inert material which is not polymerizable. This mixed solution was finally polymerized completely to form three dimensionally crosslinked insoluble infusible base polymer matrix. The inert material may be added during the preparation of partial polymerisation. A catalyst may or may not be added in the step of partial polymerisation and of polymerisation with polyolefinic compound. Instead of partial polymerisation, polymer containing solution of monomer, which polymer is contained in more than 0.1% by weight, is also applicable. The polymerizate thus obtained can be used as an carboxylic acid type cation exchange resin, when said polymerizate is composed of the monomer which has carboxylic acid radical already in itself. When the polymerizate is composed of the monomer which has carboxylic acid esters, this base matrix will be bonded to carboxylic acid by the hydrolysis. When the monovinyl arene compound monomer is polymerized with monovinyl compound having carboxylic acid or carboxylic acid esters, the reaction velocity of this partial polymerisation is smoothly regulated, and the suitable solution, which contains partially polymerized polymerizate, for the bulk or solution polymerisation with polyolefinic compound is to be obtained. In all cases, when the monovinyl arene compound is polymerized first partially and this polymer containing solution of said monomer is copolymerized with polyolefinic compound, the base matrix thus obtained does not undergo any spalling or shattering in polymerisation and in introducing the ion exchange group or in the chemical change which causes swelling or shrinking. It, therefore, becomes now possible to make a carboxylic acid type cation exchange resin in any shape and any size. If a plasticizer is added in the course of polymerisation as a substance which is indifferent to the polymerisation, and the mixed solution is subjected to polymerisation, finished base polymer matrix may be easily cut in any desired shape.

In the process of preparation of carboxylic acid type cation exchange resin made of the monovinyl compound having carboxylic acid radical with or without addition of monovinyl arene compound, and of polyolefinic compound, the monovinyl compound having carboxylic acid has the following general formula,

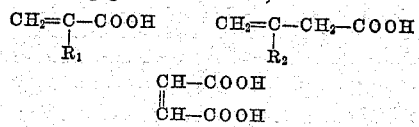

where $R_1$ and $R_2$ indicates hydrogen, halogen, monovalent alkyl radical, monovalent aryl radical, monovalent aralkyl radical and monovalent alkaryl radicals, and following are illustrative examples of these compounds: maleic acid, maleic acid anhydride, acrylic acid, methacrylic acid, α-chloroacrylic acid, α-bromoacrylic acid, α-phenylacrylic acid, α-ethylacrylic acid, α-tolylacrylic acid, α-butylacrylic acid, α-ethylphenylacrylic acid, α-cyclopentylacrylic acid, α-hexylacrylic acid, α-octylacrylic acid. In the process of preparation of carboxylic acid type cation exchange resin after the hydrolysis of base polymer matrix made of monovinyl compound having carboxylic acid esters with or without addition of monovinyl arene compound, and polyolefinic compound, said monovinyl compound having carboxylic acid esters is selected from the compound having following general formula,

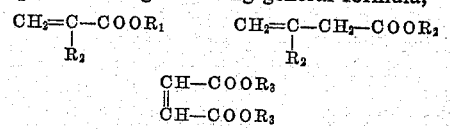

where $R_1R_2R_3$ indicates hydrogen, halogen, monovalent alkyl radical, monovalent arene radical, monovalent aralkyl radical and monovalent alkaryl radicals, and following are illustrative examples of these compounds: maleic acid esters, acrylic acid esters, methacrylic acid esters, α-chloroacrylic acid esters, α-bromoacrylic acid esters, α-phenylacrylic acid esters, α-ethylacrylic acid esters, α-tolylacrylic acid esters, α-butylacrylic acid esters, α-ethylphenylacrylic acid esters, α-cyclopentylacrylic acid esters, α-hexylacrylic acid esters, α-octylacrylic acid esters, where esters are comprising aliphatic esters such as, methyl, ethyl, n-propyl, isopropyl, n-butyl, iso-butyl, octyl, lauryl and octadecyl esters, and homolog and isomers thereof and arene esters such as benzyl, phenylethyl esters. In these both cases of carboxylic acid and acid esters, monovinyl arene compounds which is to be added to said monomer are selected from the benzene and naphthalene series, i.e. they contain not more than 10 carbon atoms in the aromatic nucleus, which monovinyl-aromatic compounds may contain in addition to the vinyl radical, from 1 to 3 halogen or lower alkyl radical other than a tertiary alkyl radical, attached to the aromatic nucleus. The alkyl substituents are preferably methyl radicals. Examples of such monovinyl-aromatic compounds are styrene, α-methylstyrene, ar-methylstyrene, ar-dimethylstyrene, ar-ethylvinylbenzene, ar-chlorostyrene, vinylnaphthalene, ar-methylvinylnaphthalene, ar-sec-butylstyrene and ar-trimethylstyrene. The polyolefinic compounds are selected from the compounds in which polymerizable double bonds exist at least two in one molecule. Examples of polyolefinic compounds are divinylbenzene, ar-divinyltoluene, ar-divinylxylene, ar-divinylchlorobenzene, divinylnaphthalene and ar-divinylethylbenzene, divinylether, butadiene, isoprene, bimethallyl, biallyl, trivinylbenzene and also effective are other unsaturated compounds, dimethallyl ether and sulfide, vinylallyl ether and those unsaturated esters, such as diallylmaleate, 2-chloroallyl crotonate and ethylenedimethacrylate.

The above monovinyl compounds having carboxylic acid or carboxylic acid esters are partially polymerized individually or in mixture with other monovinyl arene compound and thus the solution which contains at least 0.1% of partially polymerized polymerizate is obtained. The catalyst may or may not be added. The addition of other monovinyl arene compound such as styrene regulates the velocity of the polymerisation. The polymerisation is carried out at a temperature of 25–150° C. and preferably under the atmosphere containing no oxygen. The ratio of partially polymerized polymerizate to the total solution is also preferably 5–20%. To this solution the cross-linking agent such as polyolefinic compound is added with or without catalyst and also with or without a substance which is indifferent to the polymerisation, and is mixed uniformly by stirring and is subjected to the complete polymerisation. As a catalyst in this case, usual vinyl polymerisation catalyst such as benzoylperoxide, lauroylperoxide, hydrogenperoxide, potassiumpersulphate, sodiumperborate and/or ammonium persulphate can be used. This complete polymerisation may be performed in a polymerisation vessel in bulk or solution polymerisation so that the finished polymer can have any shape such as sheet or rod form. As a substance which is indifferent to the polymerisation, a plasticizer may be used. The plasticizer is to be added preferably at a ratio of 20–50% to the monovinyl compound and afterwards polymerisation is carried out completely. In this process, the polymerizate is worked easily in sheetlike form. The plasticizer can be extracted by a proper solvent from the cut sheet and thus the base polymer matrix of monovinyl compound having carboxylic acid or carboxylic acid esters, with or without addition of other monovinyl arene compound, and polyolefinic compound can be obtained in any desired shape and size. As a plasticizer, common plasticizers such as aromatic and aliphatic compound may be used, but also a polymerizate of low molecular weight made of the same monomer as a raw material for the finished product may be used. A reinforcing material for the finished polymerizate such as suitable filler or web can be used as a substance which is indifferent to the polymerisation.

In order to prepare the crack-proof granular carboxylic acid type cation exchange resins, the solution which contains partially polymerized polymerizate of monovinyl compound having carboxylic acid or carboxylic acid esters, with or without monovinyl arene compound, are mixed uniformly with the polyolefinic compound. Then the polymerisation is preferably accomplished by stirring, e.g. at a temperature of 50–150° C., a suspension of the said mixed polymer containing solution in an aqueous solution of protective colloid or thickening agent such as starch, gum tragacanth, or methyl cellulose etc. By such polymerisation while suspended in a liquid medium, insoluble base carboxylic acid type granular cation exchange resin may be obtained directly in the form of rounded and nearly spherical granules. The size of granules may be controlled, e.g. by the ration of stirring and the proportion of protective colloid or thickening agent employed. When the monomer having carboxylic acid radical is used, the polymer thus obtained has already cation exchange groups, on the other hand, when the monomer having carboxylic acid esters is used, said base polymer matrix must be hydrolysed. As hydrolysis agent, strong acid such as conc. hydrochloric acid, conc. hydrogeniodide, hydrogenfluoride, nitric acid, sulphuric acid and hydrogenperoxide. The hydrolysis is carried out under atmospheric pressure and at a comparatively high temperature. The hydrogen halide may also be used in the state of azeotropic mixture with water under comparatively high pressure. The solution of various acids, such as a solution of sulphuric acid and paratoluolsulphonic acid mixed into acetic acid solution, a formic acid solution mixed with sulphuric acid and paratoluolsulphonic acid may also be used as a hydrolysis agent. Basic hydrolysis agents are selected from aqueous or alcoholic solution of strong base: e.g., sodium hydroxide, potassium hydroxide, or quaternary ammonium hydroxide. Best result was obtained by using a 5–8% alcoholic solution of potassium hydroxide or a 2–15% aqueous solution of sodium or potassium hydroxide. The hydrolysis reaction is carried out at temperature of 30–200° C. and undergoes hydrolysis more easily when the polymerizate is swollen by suitable solvent. As solvent, those solvents are preferred which may not be decomposed by the hydrolysis agents, e.g. acetone, dichlorethylene, benzene, dioxane and chlorbenzene. In this hydrolysis reaction, usually 100% of carboxylic ester radical is hydrolysed. However, instead of hydrolysing the total of carboxylic ester radical, resin may be partially hydrolysed, and thus the electrochemical properties of the finished product, cation exchange resin, may be varied at will according to the degree of hydrolysis of carboxylic ester radical. Furthermore, when the amount of additional monovinyl arene compound is varied, the optimum results for swelling and other electrochemical properties are also obtained.

As above mentioned, for the preparation of the carboxylic acid type cation exchange resins having at least two dimensions each in excess of 1 cm. and crackproof granular carboxylic type cation exchange resins, monovinyl compound having carboxylic acid or carboxylic acid esters are first partially polymerized with or without addition of monovinyl arene compound and a solution which contains at least 0.1% of this partially polymerized polymerizate is prepared, to this solution crosslinking agent such as polyolefinic compound is added and mixed uniformly and finally this mixed solution was subjected to the complete polymerisation, whereas the known process is merely copolymerisation of the above cited monomers themselves. The carboxylic acid type cation exchange resins obtained by this invention is dimensionally very stable and does not shatter or spall in any step, such as shrinking gelation during the polymerisation, and steps of hydrolysis. Thus, uniform carboxylic acid type cation exchange resins having at least two dimensions each in excess of 1 cm. and crackproof carboxylic acid type cation exchange resin is to be obtained which does not shatter or spall by the swelling and the shrinking during their preparation. The following examples illustrate the practice of the invention but are not to be construed as limiting the scope of this invention.

The following Examples 1–6 illustrate how the base polymeric matrix made of monovinyl compound having carboxylic acid esters may be prepared:

EXAMPLE 1

400 parts of distilled methylmethacrylate was subjected to the partial polymerisation in the atmosphere of nitrogen at a temperature of 65° C. for 14 hours. The solution has a viscosity of about 800 poises and was about 24% polymerized according to the analysis. 32 parts of divinylbenzene, 48 parts of ethylvinylbenzene and 140 parts of diethylphthalate as a plasticizer, were added to this solution and mixed uniformly. The whole mixture was deaerated and subjected to solution polymerisation in the atmosphere of nitrogen at a temperature of 70° C. for 19 hours and further at a temperature of 100° C. for 6 hours. A polymerizate of white turbid and opaque solid was thus obtained, and this polymerizate was easily worked into any shape such as sheet and rod etc. When the polymerisation was carried out by usual solution polymerisation using the same monomers, there occurred cracking during the polymerisation and a polymerizate of large dimension was not obtained. The fragments of this polymerizate were glassy and transparent and showed different characteristics from the polymerizate obtained by the process of this invention.

EXAMPLE 2

400 parts of distilled methylmethacrylate was subjected to the partial polymerisation in the atmosphere of nitrogen at a temperature of 65° C. for 14 hours. The solution had a viscosity of about 800 poises and was about 24% polymerized according to the analysis. 32 parts of divinylbenzene and 48 parts of ethylvinylbenzene were added and mixed well. The solution was deaerated first and then poured into a polymerisation vessel of hexahedron form, the dimension of internal size being, 50 cm. long and 50 cm. high, and the clearance between the both walls being 0.7 mm. The polymerisation vessel was covered by a lid and was immersed in constant temperature bath at a temperature of 70° C. for 9 hours, then at a temperature of 100° C. for 6 hours and thus the bulk polymerisation was completed. By this process a polymerizate having the dimension of 0.7 mm. thick and 50 cm. x 50 cm., in area was obtained. The sheet was white turbid and elastic and had no crack.

When the same amount of monomers were subjected to the polymerisation in the same vessel at a temperature of 70° C. for 19 hours and then at a temperature of 100° C. for 6 hours according to the ordinary bulk polymerisation, there occurred shattering and cracking of the polymerizate during the polymerisation and only a sheet of about 5 cm. x 5 cm. in area was obtained. The small sheet was glassy and transparent, which differed from the polymerizate obtained by the process of this invention.

EXAMPLE 3

After the deaeration of the solution which was obtained by adding divinylbenzene and ethylvinylbenzene to the solution containing partially polymerized polymerizate, as described in Example 2, the said solution was poured into the polymerisation vessel having sheet form cavity as described in the same example. Webs made of glass fiber were inserted also into this solution and then the solution was subjected to the polymerisation. In this way, reinforced polymer matrix was obtained.

EXAMPLE 4

A blockformed polymerizate which was obtained according to the process described in Example 1 was worked by lathe and a polymerizate of any shape such as rod or pipe was obtained. The plasticizer which was contained in these polymerizates, were extracted with solvent, and thus polymerizates of any shape were obtained.

EXAMPLE 5

400 parts of distilled methylmethacrylate was partially polymerized according to the process described in Example 1. To this solution 20 parts of divinylbenzene, 30 parts of ethylvinylbenzene and 20 parts of butadiene as a crosslinking agent and 0.4 part of benzoylperoxide as a polymerisation catalyst were added and mixed well. The whole mixed solution was subjected to bulk polymerisation in the atmosphere of nitrogen at a temperature of 70° C. for 25 hours, and then at a temperature of 90° C. for 10 hours, in a pressure tight vessel according to the process described in the preceding examples. A polymerizate obtained in this way had the same physical characteristic as those in Example 1, differing from those obtained by the process of ordinary known bulk polymerisation by using the same monomers.

EXAMPLE 6

56 parts of commercial methylmethacrylate polymer was pulverized and dissolved in 344 parts of distilled methylmethacrylate monomer. This solution was used instead of the solution containing partially polymerized polymerizate of methylmethacrylate in Examples 1–5 and was subjected to the polymerisation. A polymerizate which had the same physical characteristic as was described in Examples 1–5 was obtained.

The next Example 7 illustrates how the base polymer matrix of preceding Examples 1–5 having carboxylic acid esters may be hydrolysed.

EXAMPLE 7

A polymer sheet having the dimension of 0.7 mm. thick and 10 cm. x 10 cm. in area was obtained according to the process described in the Examples 1–6. Ten of these sheets were placed in a reaction vessel equipped with reflux condenser. 80 parts of sodium hydroxide were dissolved in 1000 parts of ethylalcohol and was poured into the reaction vessel. The solution was heated at the reflux temperature of the solution for 72 hours. After the reaction, the sheets were then dipped in water and washed and stored. The transport number of sodium ion of this cation exchange sheet was measured in 1.5 N. sodium chloride solution at a temperature of 25° C., and specific electric conductivity was measured in 0.5 N. sodium chloride solution at a temperature of 25° C. These results were illustrated in following table.

Table

|  | Transport number of sodium ion in 1.5 N.NaCl solution at 25° C. (Percent) | Specific electric conductivity in 0.5 N.NaCl solution at 25° C. $(\Omega^{-1}\,cm^{-1})\times 10^3$ |
|---|---|---|
| Cation exchange resin from the base polymer matrix of Example 1 | 78 | 22 |
| Cation exchange resin from the base polymer matrix of Example 2 | 82 | 20 |
| Cation exchange resin from the base polymer matrix of Example 3 | 82 | 16 |
| Cation exchange resin from the base polymer matrix of Example 4 | 78 | 22 |
| Cation exchange resin from the base polymer matrix of Example 5 | 75 | 24 |

As described already in Examples 1–6, when the monomers of methylmethacrylate and divinylbenzene were polymerized according to the process already known, a sheet of polymerizate of larger area was not obtained, but only a sheet having the dimension of 0.7 mm. thick and 2 cm. x 1 cm. in area was obtained from the fragments of the said polymerizate. This small sheet was subjected to the hydrolysis under the same condition as described in this example. Even this small sheet was cracked into smaller pieces of about 5 mm. size due to the swelling during the hydrolysis, so that any sheet having a large area could not be obtained after the hydrolysis.

Any shape of polymerizate obtained according to the process described in the Example 4 was to be hydrolysed and thus any shape of cation exchange resin of carboxylic acid type was obtained.

EXAMPLE 8

Ethylacrylate was used instead of methylmethacrylate in the Examples 1–7 and a similar polymerizate was obtained. The following is one of these examples. 400 parts of distilled ethylacrylate was polymerized partially at a temperature of 80° C. for 6–18 hours in the atmosphere of nitrogen until the solution had a viscosity of about 800 poises and was about 24% polymerized according to the analysis.

As the induction period of this partial polymerisation was not constant, the time of the polymerisation of this solution varied case by case in order to get the desired viscosity.

44 parts of divinylbenzene, 55 parts of ethylvinylbenzene, 120 parts of dimethylphthalate as a plasticizer, and 0.08 parts of benzoylperoxide as a catalyst were added to this solution and mixed uniformly.

The whole mixture was deaerated and subjected to solution polymerisation in the atmosphere of nitrogen at a temperature of 50° C. for 48 hours and further on at a temperature of 70° C. for 24 hours, and then at a temperature of 100° C. for 24 hours, and thus the polymerisation was completed.

Polymer sheets having the dimension of 0.7 mm. thick and 50 cm. x 50 cm. in area were obtained, as described in preceding examples. These sheets were white turbid and elastic and had no crack.

Ten of these sheets were placed in a reaction vessel equipped with reflux condenser. 300 parts of sodium hydroxide were dissolved in 700 parts of water and was poured into the reaction vessel. The solution was heated at the reflux temperature of the solution for 48 hours. After the reaction, the sheets were thrown into the water and washed and stored. The transport number of sodium ion of this cation exchange sheets was 90% in 1.5 N. sodium chloride solution at a temperature of 25° C. and the specific electric conductivity was $25\times10^{-3}$ mho cm.$^{-1}$ in 0.5 N. sodium chloride solution at a temperature of 25° C.

EXAMPLE 9

This example illustrates that the hydrolysis was carried out more easily when the resin was swollen prior to the hydrolysis or was hydrolysed in the presence of swelling agent. Ten sheets of 0.7 mm. thick and 10 cm. x 10 cm. in area obtained in Examples 1–7 were hydrolysed in the mixture of 1000 parts of ethylalcohol, containing 80 grams of sodium hydroxide and 100 parts of dioxane at the reflux temperature of the solution for 50 hours.

The transport number of sodium ion was 85% in 1.5 N. sodium chloride solution at a temperature of 25° C., and the specific electric conductivity was $25\times10^{-3}$ mho cm.$^{-1}$ in 1.5 N. sodium chloride solution at a temperature of 25° C.

EXAMPLE 10

A mixture of 360 parts of freshly distilled ethylacrylate and 40 parts of styrene was polymerized partially at a temperature of 80° C. for 10 hours in the atmosphere of nitrogen until the solution had a viscosity of about 400 poises. The solution was about 20% polymerized according to the analysis. In this case induction period did not influence the polymerisation, so the polymerisation was carried out smoothly.

44 parts of divinylbenzene, 55 parts of ethylvinylbenzene, 120 parts of dimethylphthalate as a plasticizer, and 0.08 part of benzolyperoxide as a catalyst were added to this solution and mixed uniformly. The whole mixture was deaerated and subjected to solution polymerisation in the atmosphere of nitrogen at a temperature of 50° C. for 24 hours, further on at a temperature of 70° C. for 24 hours, and then at a temperature of 100° C. for 24 hours, and thus the polymerisation was completed.

By this process, a polymerizate having the dimension of 0.7 mm. thick and 50 cm. x 50 cm. in area was obtained. These sheets were white turbid and elastic and had no crack. Ten of these sheets were placed in a reaction vessel equipped with reflux condenser. 300 parts of sodium hydroxide were dissolved in 700 parts of water and was poured into the reaction vessel. After the reaction, the sheets were dipped into water and washed and stored. The transport number of sodium ion of this cation exchange sheet was 90% in 1.5 N. sodium chloride solution at a temperature of 25° C. and the specific electric conductivity was $20 \times 10^{-3}$ mho cm.$^{-1}$ in 0.5 N. sodium chloride solution at a temperature of 25° C.

EXAMPLE 11

Methylmethacrylate was used instead of styrene in Example 10, and a similar polymerizate was obtained.

EXAMPLE 12

180 parts of purified styrene, 200 parts of maleic anhydride and 100 parts of acetone and 120 parts of dimethylphthalate was partially polymerized at a temperature of 60° C. for 2 hours. This partially polymerized polymerizate had a viscosity of about 1000 poises and was about 25% polymerized according to the analysis. To this solution 40 parts of divinylbenzene, 60 parts of ethylvinylbenzene was added and mixed uniformly. The solution was next deaerated and subjected to the solution polymerisation in the atmosphere of nitrogen and at a temperature of 90° C. for 24 hours, thus the polymerisation was completed.

As in Examples of 1–7, polymer sheet having the dimension of 0.7 mm. thick and 50 cm. x 50 cm. in area was obtained. These sheets were immersed into an aqueous sodium hydroxide solution of 5% at a temperature of 100° C. for about 10 hours, and was washed thoroughly, first with distilled water, then with a 5% sodium chloride solution. Thus the cation exchange sheets having carboxylic exchange groups in sodium form was obtained without any cracking, spalling, and shattering during the polymerisation and hydrolysis reaction.

The transport number of sodium ion of this cation exchange sheet was 87% in 1.5 N. sodium chloride solution at a temperature of 25° C. and the specific electric conductivity was $15 \times 10^{-3}$ mho cm.$^{-1}$ in 0.5 N. sodium chloride solution.

EXAMPLE 13

A mixture of 280 parts of freshly distilled acrylic acid and 120 parts of styrene was polymerized partially at a temperature of 80° C. for 8 hours in the atmosphere of nitrogen until the solution had a viscosity of about 800 poises. The solution was about 25% polymerized according to the analysis. In this case induction period did not influence the polymerisation, so the polymerisation was carried out smoothly.

44 parts of divinylbenzene, 55 parts of ethylvinylbenzene, and 120 parts of dimethylphthalate as a plasticizer were added to this solution and mixed uniformly.

The whole mixture was deaerated and subjected to solution polymerisation in the atmosphere of nitrogen at a temperature of 50° C. for 24 hours, further on at a temperature of 70° C. for 24 hours, and then at a temperature of 100° C. for 24 hours, and thus the polymerisation was completed.

By this process, a polymerizate having the dimension of 0.7 mm. thick and 50 cm. x 50 cm. in area was obtained. These sheets were white turbid and elastic and had no crack.

Ten of these sheets were dipped in an aqueous solution of 10% sodium hydroxide. In this way, said resin was changed to sodium from cation exchange resins.

After that, the sheets were then dipped into water and washed thoroughly and stored in sodium chloride solution. The transport number of sodium ion of this cation exchange sheet was 88% in 1.5 N. sodium chloride solution at a temperature of 25° C. and the specific electric conductivity was $18 \times 10^{-3}$ mho cm.$^{-1}$ in 0.5 N. sodium chloride solution at a temperature of 25° C.

What we claim is:

1. A solid unfractured cation exchange resin having at least two dimensions each in excess of one cm. and comprising a three dimensionally crosslinked polymer matrix bonded to carboxylic cation exchange groups; said matrix being a polymerization product of a solution mixture of (I) monovinyl compound having the structure

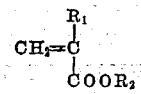

wherein $R_1$ is a member selected from the class consisting of hydrogen, halogen, and methyl radicals and $R_2$ is a member selected from the class consisting of hydrogen, methyl and ethyl radicals, (II) polymerizate of (I), (III) divinylbenzene and (IV) a dialkyl phthalate as a plasticizer, and said mixture containing from 20% to 90% by weight of (I), from 0.05% to 27% by weight of (II), from 0.5% to 27% by weight of (III), and from 10% to 50% by weight of (IV); said cation exchange groups being already bonded to said matrix when said monovinyl compound has the structure

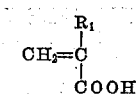

and said cation exchange groups being bonded to said matrix after hydrolysis of acid ester group when said monovinyl compound has the structure

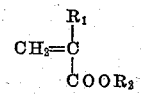

wherein $R_2$ is a member selected from the class consisting of methyl and ethyl radicals.

2. A solid unfractured cation exchange resin having at least two dimensions each in excess of one cm. and comprising a three dimensionally crosslinked polymer matrix bonded to carboxylic cation exchange groups; said matrix being a polymerization product of a solution mixture of (I) styrene, (II) monovinyl compound having the structure

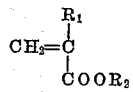

wherein $R_1$ is a member selected from the class consisting of hydrogen, halogen and methyl radicals and $R_2$ is a member selected from the class consisting of hydrogen, methyl and ethyl radicals, (III) polymerizate of (I) and (II), (IV) divinylbenzene and (V) a dialkylphthalate as a plasticizer, and said mixture containing from 0% to 80% by weight of (I), from 20% to 90% by weight of (II), from 0.05% to 27% by weight of (III), from 0.5% to 27% by weight of (IV), from 10% to 50% by weight of (V); said cation exchange groups being already bonded to said matrix when the monovinyl compound has the structure

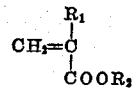

wherein $R_2$ is a member selected from the class consisting of methyl and ethyl radicals.

3. The article defined by claim 1, wherein the number of carbon atoms of the alkyl radicals of the dialkylphthalate is from 1 to 8.

4. A granular cation exchange resin comprising a crosslinked granular polymer matrix bonded to carboxylic cation exchange groups; said matrix being a polymerization product of a solution mixture of (I) of monovinyl compound having the structure

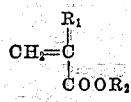

wherein $R_1$ is a member selected from the class consisting of hydrogen, halogen and methyl radicals and $R_2$ is a member selected from the class consisting of hydrogen, methyl and ethyl radicals, (II) polymerizate of (I), (III) divinylbenzene and (IV) dialkylphthalate as a plasticizer, and said mixture containing from 20% to 90% by weight of (I), from 0.05% to 27% by weight of (II), from 0.5% to 27% by weight of (III), and from 10% to 50% by weight of (IV); said cation exchange groups being already bonded to said matrix when said monovinyl compound has the structure

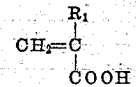

and said cation exchange groups being bonded to said matrix after the hydrolysis of the acid ester group when said monovinyl compound has the structure

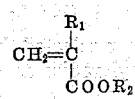

wherein $R_2$ is a member selected from the class consisting of methyl and ethyl radicals.

5. A solid unfractured cation exchange resin composition having at least two dimensions each in excess of one cm. and comprising a three dimensionally crosslinked polymer matrix bonded to carboxylic cation exchange groups; said matrix being a polymerization product of a solution mixture of (I) monovinyl compound having the structure

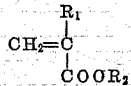

wherein $R_1$ is a member selected from the class consisting of hydrogen, methyl and ethyl radicals, (II) polymerizate of (I), (III) divinylbenzene and (IV) dialkylphthalate as a plasticizer, and said mixture containing from 20% to 90% by weight of (I), from 0.05% to 27% by weight of (II), from 0.5% to 27% by weight of (III), and from 10% to 50% by weight of (IV); said cation exchange groups being already bonded to said matrix when said monovinyl compound has the structure

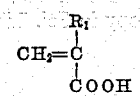

and said cation exchange group being bonded to said matrix after hydrolysis of acid ester group when said monovinyl compound has the structure

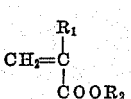

wherein $R_2$ is a member selected from the class consisting of methyl and ethyl radicals.

6. A solid unfractured cation exchange resin composition having at least two dimensions each in excess of one cm. and comprising a three dimensionally crosslinked polymer matrix bonded to carboxylic cation exchange groups; said matrix being a polymerization product of a solution mixture of (I) styrene, (II) monovinyl compound having the structure

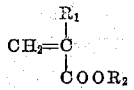

wherein $R_1$ is a member selected from the class consisting of hydrogen, halogen and methyl radicals and $R_2$ is a member selected from the class consisting of hydrogen methyl and ethyl radicals, (III) polymerizate of (I) and (II), (IV) divinylbenzene and (V) dialkylphthalate as a plasticizer, and said mixture containing from 0% to 80% by weight of (I), from 20% to 90% by weight of (II), from 0.05% to 27% by weight of (III), from 0.5% to 27% by weight of (IV), from 10% to 50% by weight of (V); said cation exchange groups being already bonded to said matrix when said monovinyl compound has the structure

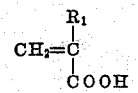

groups being bonded to said matrix after hydrolysis of the acid ester group when said monovinyl compound has the structure

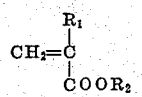

wherein $R_2$ is a member selected from the class consisting of methyl and ethyl radicals.

7. A solid unfractured cation exchange resin sheet comprising a three dimensionally crosslinked sheet from polymer matrix bonded to carboxylic cation exchange groups; said sheet form matrix being sliced from block form matrix into sheet form matrix, and said block form matrix being formed as a polymerization product of a solution mixture of (I) monovinyl compound having the structure

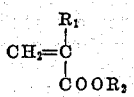

wherein $R_1$ is a member selected from the class consisting of hydrogen, halogen and methyl radicals and $R_2$ is a member selected from the class consisting of hydrogen, methyl and ethyl radicals, (II) polymerizate of (I), (III) divinylbenzene and (IV) a dialkylphthalate as a plasticizer, and said mixture containing from 20% to 90% by weight of (I), from 0.05% to 27% by weight of (II), from 0.5% to 27% by weight of (III), and from 10% to 50% by weight of (IV); said cation exchange groups being already bonded to said matrix when said monovinyl compound has the structure

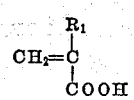

and said cation exchange groups being bonded to said matrix after hydrolysis of the acid ester group when said monovinyl compound has the structure

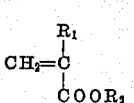

wherein $R_2$ is a member selected from the class consisting of methyl and ethyl radicals.

8. A solid unfractured cation exchange resin sheet comprising a three dimensionally crosslinked sheet form polymer matrix bonded to cation exchange groups; said sheet form matrix being sliced from block form matrix, and said block form matrix being a polymerization product of a solution mixture of (I) styrene, (II) monovinyl compound having the structure

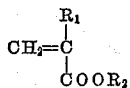

wherein $R_1$ is a member selected from the class consisting of hydrogen, halogen and methyl radicals and $R_2$ is a member selected from the class consisting of hydrogen, methyl and ethyl radicals, (III) polymerizate of (I) and (II), (IV) divinyl benzene and (V) dialkylphthalate as a plasticizer, and said matrix containing from 0% to 80% by weight of (I), from 20% to 90% by weight of (II), from 0.05% to 27% by weight of (III), from 0.5% to 27% by weight of (IV), and from 10% to 50% by weight of (V); said cation exchange groups being already bonded to said matrix in case said monovinyl compound has the structure

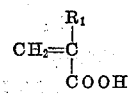

and said cation exchange groups being bonded to said matrix after hydrolysis of the acid ester group when said olefinic compound has the structure

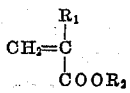

wherein $R_2$ is a member selected from the class consisting of methyl and ethyl radicals.

9. The process for preparing a carboxylic cation exchange resin sheet comprising the sheet form matrix of polymerization product of a solution mixture of (I) monovinyl compound having the structure

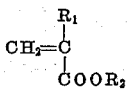

wherein $R_1$ is a member selected from the class consisting of hydrogen, halogen and methyl radicals and $R_2$ is a member selected from the class consisting of hydrogen, methyl and ethyl radicals, (II) polymerizate of (I), (III) divinylbenzene and (IV) a dialkylphthalate as a plasticizer, said process comprising the steps of polymerizing the block form of said solution mixture wherein said solution mixture contains from 20% to 90% by weight of (I), from 0.05% to 27% by weight of (II), from 0.5% to 27% by weight of (III), and from 10% to 50% by weight of (IV); slicing the polymerized block form matrix into sheet form matrix; and hydrolyzing the sheet form matrix when said monovinyl compound has the structure

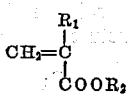

wherein $R_2$ is a member selected from the class consisting of methyl and ethyl radicals.

10. The process for preparing the carboxylic cation exchange resin sheet comprising the sheet form matrix of polymerization product of a solution mixture of (I) styrene, (II) monovinyl compound having the structure

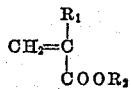

wherein $R_1$ is a member selected from the class consisting of hydrogen, methyl and ethyl radicals and $R_2$ is a member selected from the class consisting of hydrogen, methyl and ethyl radicals, (III) polymerizate of (I) and (II), (IV) divinylbenzene and (V) dialkylphthalate as a plasticizer, said process comprising the steps of polymerizing the block form of said solution mixture, wherein said solution mixture contains from 0% to 80% by weight of (I), from 20% to 90% by weight of (II), from 0.05% to 27% by weight of (III), from 0.5% to 27% by weight of (IV), and from 10% to 50% by weight of (V); cutting the polymerized block form matrix into sheet form matrix; and hydrolyzing the sheet form matrix when said monovinyl compound has the structure

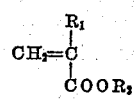

wherein $R_2$ is a member selected from the class consisting of methyl and ethyl radicals.

References Cited in the file of this patent

UNITED STATES PATENTS

| | | |
|---|---|---|
| 2,318,845 | Feagin et al. | May 11, 1943 |
| 2,340,110 | D'Alelio | Jan. 25, 1944 |
| 2,340,111 | D'Alelio | Jan. 25, 1944 |
| 2,418,978 | Mertens | Apr. 15, 1947 |
| 2,420,284 | Carswell | May 6, 1947 |
| 2,468,094 | Marks | Apr. 26, 1949 |
| 2,500,598 | Axelrod | Mar. 14, 1950 |
| 2,527,300 | Dudley | Oct. 24, 1950 |
| 2,539,377 | Staudinger et al. | Jan. 23, 1951 |
| 2,636,851 | Juda et al. | Apr. 28, 1953 |
| 2,697,080 | D'Alelio | Dec. 14, 1954 |
| 2,700,185 | Lee | Jan. 25, 1955 |
| 2,730,768 | Clarke | Jan. 17, 1956 |
| 2,731,408 | Clarke | Jan. 17, 1956 |
| 2,731,411 | Clarke | Jan. 17, 1956 |
| 2,732,350 | Clarke | Jan. 24, 1956 |
| 2,734,044 | Bezman | Feb. 7, 1956 |

OTHER REFERENCES

Chemical & English News, vol. 30, No. 43, Oct. 27, 1952, page 4513. (Copy in Sci. Library.)